United States Patent [19]

Andersson et al.

[11] Patent Number: 4,737,879

[45] Date of Patent: Apr. 12, 1988

[54] REDUNDANT DIGITAL DISTANCE RELAY

[75] Inventors: Finn Andersson; Gert Apéll; Nils Brandt, all of Västerås, Sweden

[73] Assignee: Asea AB, Västerås, Sweden

[21] Appl. No.: 864,210

[22] Filed: May 19, 1986

[30] Foreign Application Priority Data

May 22, 1985 [SE] Sweden ............................ 8502508

[51] Int. Cl.⁴ .............................................. H02H 3/38
[52] U.S. Cl. ......................................... 361/80; 361/65; 364/483; 371/16
[58] Field of Search ................. 361/62-66, 361/71, 79-81, 83, 96; 364/483; 371/20, 16; 324/522

[56] References Cited

U.S. PATENT DOCUMENTS

| | | | |
|---|---|---|---|
| 4,276,605 | 6/1981 | Okamoto et al. | 364/483 |
| 4,339,802 | 7/1982 | Yamaura et al. | 364/483 |
| 4,351,013 | 9/1982 | Matsko et al. | 364/483 X |
| 4,371,908 | 2/1983 | Andow et al. | 364/483 X |
| 4,409,635 | 10/1983 | Kraus | 361/62 |
| 4,524,446 | 6/1985 | Sun et al. | 361/66 X |
| 4,530,024 | 7/1985 | Brady, Jr. | 361/63 |

FOREIGN PATENT DOCUMENTS 2915047 10/1979 Fed. Rep. of Germany .
2932929 5/1980 Fed. Rep. of Germany .

OTHER PUBLICATIONS

"Brown Boveri Review", pp. 32-36; vol. 72, No. 1; Jan. 1985.

Primary Examiner—A. D. Pellinen
Assistant Examiner—Derek S. Jennings
Attorney, Agent, or Firm—Watson, Cole, Grindle & Watson

[57] ABSTRACT

A method and a device in connection with digital distance relays for obtaining a backup function in the event of faults in the digital signal processing and/or in the event of faults detected during automatic testing. The method comprises testing the distance relay continuously, in case of a faultless network, with respect to the digital signal processing by means of a central control unit. In case of a characteristic fault on the network, the distance relay is switched over from testing to protective function involving measurement by means of measurement signal units included in the distance relay. In case of a fault on the network and a simultaneous fault in the digital signal processing, fault signals from the measurement signal units, via time delay circuits and logical elements, bring about tripping of the line section subjected to the fault. When a fault is detected in the digital signal processing, an alarm function is triggered.

13 Claims, 1 Drawing Sheet

REDUNDANT DIGITAL DISTANCE RELAY

TECHNICAL FIELD

A distance protection device or distance relay is used as a protection means in the case of short-circuits and/or ground faults for overhead transmission lines and cables in a power supply system. Nowadays, such protection devices are normally constructed using static semiconductor components which operate digitally. The start relays, measuring circuits, phase selection circuits, timing circuits and tripping circuits used in these protection means thus need to be able to operate with very short operating times.

BACKGROUND ART

By way of introduction, the principle of operation of a modern distance relay will first be described.

The distance relay is connected to transformers for measuring the current and voltage of the transmission line. On the basis of the amplitudes and phase positions of these quantities, the impedance of the line can be measured in the desired direction from the measuring transformer of the distance relay and be compared with a region of operation, set in that distance relay, in an impedance plane. The outer limit of the region of operation indicates the smallest impedance value which the transmission line can be expected to have during normal operation of the power supply system. When the line impedance lies within the region of operation a fault is present on the line and the distance relay is required to deliver a tripping pulse to the circuit-breakers.

The region of operation is often made in the form of a quadrangle in the impedance plane (the R-X-plane), and the limits of the region in the resistive and the reactive directions can normally be separately set.

The region of operation of the distance relay can also be extended in pre-set, time-dependent steps, whereby a backup protective function based on time selectivity can be obtained. In this way, a distance relay can comprise several protective or measuring zones. Broadly this functions in such a way that, for example, the distance relay operates instantaneously for faults within a line section closest to the measuring point. Within a second measuring zone, which comprises the line section of the first zone plus an additional line section, the distance relay operates after a certain, set time delay. Within a third measuring zone, comprising the line sections of the second measuring zone plus a further additional line section, operation is obtained in the event of a fault after an additional time delay, and so on.

The distance relays normally also have a direction sensing function. A transmission line which is fed from a plurality of stations can therefore be protected both against faults located ahead and against faults located behind (in relation to a station and a defined measuring direction). Therefore, distance relays located at respective ends of any section of the line also need to communicate with each other.

As mentioned above, distance relays are nowadays often constructed from static components operating digitally and controlled froma microprocessor. Even if these static components and the microprocessor have high reliability, faults or missing operations cannot, of course, be entirely avoided. Since failure to take protective action in the event of a line fault may have serious consequences, various ways of obtaining redundancy are attempted.

Redundancy is often obtained by the provision of parallel-operating protective relays having largely the same functions, possibly with different measuring principles, etc. Sometimes, parallel protective relays from different suppliers or relays having operating times of different duration are selected.

Another way of guarding against a distance relay failing to operate when required to do so, is to carry out test sequences of the tripping function. This can be done by means of external test equipment or by a self-monitoring or self-testing program built into the distance relay.

Testing of the operation of the distance relay can be performed at specified time intervals or according to other criteria, for example when the load states indicate stable conditions are existing.

Although the test times can be kept short and different more or less intelligent methods for determining safe times when the tests are to be performed have been developed, the fact remains that line faults occurring during the test time will not trigger a protective action. This entails an undesired uncertainty as regards the safe functioning of the distance relay, which may be felt to be undesirable.

OBJECTS OF THE INVENTION

One object of the invention is to provide a method for obtaining a backup function for a digital distance relay in the case of a fault arising in the digital signal processing and/or in the case of a fault arising during an automatic test cycle. A further object is to provide a device for carrying out this method.

The invention thus provides a new concept for redundancy for this type of protection device. Protective relays in general and distance relays in particular are positioned, with their respective measuring units for quantities to be monitored, on-line in order to be able to exert an influence more or less directly on tripping or blocking functions in the event that the fault level is exceeded. As mentioned above under the heading "BACKGROUND ART", however, this direct tripping or blocking possibility does not exist during testing of the various parts of the protection device.

The new concept according to the invention means that instead of being directly on-line for tripping or blocking, the distance relay continuously tests the digital signal processing via a central control unit.

SUMMARY OF THE INVENTION

According to known technique, measurement signals from the various measuring zones of a protective relay are passed to and be available in the central control unit via a normal databus. In addition to these normal measurement signals, the central control unit, starting elements and/or measuring elements are provided with additional fixed signals which are activated when a critical change, detected by the normal measuring units, has taken place in the power supply system.

The central control unit, which—as mentioned above—continuously tests the signal processing, is switched over from testing to its intended process for selective treatment of a fault condition in the power supply system when any of these fixed signals indicates a critical change in the network. As mentioned above, the measurement signals are directly available.

When a fault has been determined on the network, the circuit breakers have been triggered, the fault has been eliminated and the network has again become stable, the distance relay can resume the continuous testing of the digital signal processing by the central control unit.

If, during a test phase, a fault is detected within the distance relay, the invention incorporates the activation of an alarm function, whereby measures for removing the fault can be initiated. With the aid of additional fixed signals, which are activated when a critical change has occurred in the power supply system, tripping and blocking functions can be obtained also in the case of faults in the digital signal processing, because these signals—directly or via time-delay circuits—activate the protective function.

According to the invention, the central control unit also undertakes the testing of the measuring elements of the three measuring zones at regularly recurring time intervals via the databus. During testing of measuring elements, the measuring elements of one zone at a time are tested, during which the zone under test is blocked. When a fault is detected in any measuring element during a test period, this measuring element remains blocked and an alarm signal is actuated, whereby measures for fault removal can be initiated. If, during such blocking, a fault is determined on the network, the central control unit—as mentioned above—will be switched over from testing to the conventional measuring process for selective treatment of a fault condition—but with one important change. If one of the zones is blocked, another zone is given the same function as the blocked one. In this way, a redundancy is obtained even if one of the zones is not available.

The new principle of redundancy according to the invention permits greater availability in connection with testing and in the case of faults discovered than is available with conventional redundancy methods.

The possibility of building the redundancy into and integrating it with the distance relay, in the manner described above, results in simpler manufacture and installation and a simpler redundancy system in comparison with conventional redundancy methods; also, the total cost for obtaining satisfactory redundancy is lower than with prior art arrangements.

BRIEF DESCRIPTION OF THE DRAWING

The invention will now be described in greater detail, by way of example, with reference to the accompanying drawing, wherein.

DESCRIPTION OF THE PREFERRED EMBODIMENT

Figure 1:
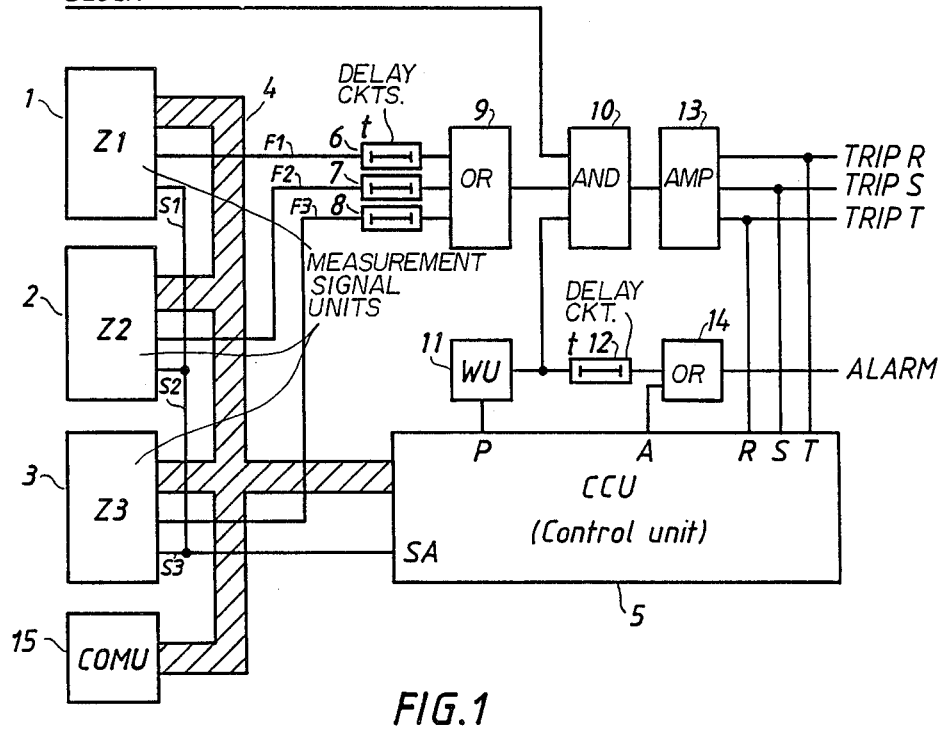
FIG. 1 shows a device for carrying out the method according to the invention.

FIG. 1 shows a device for carrying out a method according to the invention.

Figure 2:
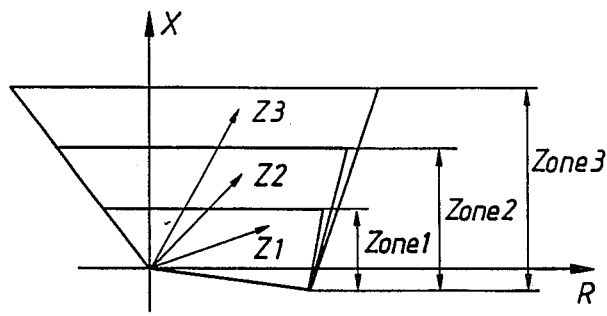
FIG. 2 shows the regions of operation of a distance relay in an R-X plane with three measuring zones.

FIG. 2 shows, in the impedance plane, a typical region of operation for three zones of a transmission line, plotted according to known techniques. If current and voltage measurements indicate that the line impedance lies within any of zones 1, 2 or 3—for example, that the impedance Z1, Z2 or Z3 according to FIG. 2 can be identified—according to known techniques, time-selective information about this is obtained, and after associated digital signal processing in the central control unit this leads to tripping of a circuit breaker or other protection device.

In FIG. 1 the units 1, 2 and 3 have been symbolically marked Z1, Z2 and Z3, respectively. The intention of such marking is to indicate that output signals from units Z1, Z2 and Z3, respectively, constitute the signals which are obtained when the distance relay determines a fault in the respective zone 1, 2 or 3. The units 1, 2 and 3 will therefore be designated as measurement signal units in the following. Output signals are transmitted via a databus 4 to a central control unit 5, designated CCU in FIG. 1. When the signal processing portion in unit 5 is faultless, and when a critical fault on the network has been determined, tripping signals, based on measured values via the databus, will be sent to the circuit-breakers for the faulty phase(s) in question, via the output RST of the unit 5.

From the measurement signal units 1, 2 and/or 3 fixed signals (shown as F1, F2 and F3 in FIG. 1) can also be obtained, which are activated when a critical change has occurred in the power supply system. The activation may, for example, occur when a phase current exceeds a certain value, when the zero sequence current exceeds a certain value, or when the impedance on the line to be protected lies within the respective zone 1, 2 or 3.

The fixed signals F1, F2 and F3 are passed via time-delay elements 6, 7 and 8 to an OR-element 9. When any of signal F1, F2 or F3 has been activated, a signal is thus obtained on the output of the OR-element 9, which signal is passed to one of the inputs of an AND-element 10. To this element 10 there is also supplied an inverted blocking signal ("$\overline{\text{BLOCK}}$") if the system is not blocked.

From each of the measurement signal units 1, 2 and 3, an additional fixed signal S1, S2 and S3 is obtained when the same critical change in the power supply system has occurred as that which activates a signal F1, F2 or F3. The lines for the signals S1, S2 and S3 are jointly passed to a start input SA in the unit 5.

The CCU unit 5 is designed to generate a pulse train, which is led from an output P to a monitoring unit 11, designated WU (watch dog unit), as long as a faultless state exists in the digital processing part of the distance relay. In this state, the output of WU 11 is reset.

The CCU unit 5 is also designed to continuously test the digital signal processing circuits of the distance relay which are included in the unit 5. This testing continues as long as none of start signals S1, S2 or S3 is present, that is, as long as there is no input signal on the input SA of the unit 5.

Now, if the testing shows that a fault exists in the digital signal processing part of the CCU unit 5, the pulse train to the unit 11 terminates, a signal thus being obtained on the output of the unit 11. After a certain time delay in the element 12, alarm is triggered and the nature of the fault as well as the location of the fault can be presented on a suitable display (not shown).

The output of the unit 11 is also connected to one of the inputs of the AND-element 10. This means that if, during the duration of a fault in the signal processing part of the unit 5, a critical change occurs in the power supply network, this will lead to tripping of all phases (by generation of "TRIP" signals) since all the inputs of the AND-element 10 have input signals. The device 13 consists of a normal amplifier unit which makes it possible to drive somewhat more power-demanding tripping functions.

If, during a faultless state in the digital signal processing part, a critical fault on the power supply system arises, a signal is obtained on the input SA of the unit 5. The pulse train to the unit 11 will continue, the AND-element 10 being blocked. Under these conditions, a start signal to the input SA implies that the information about the condition of the network, which arrives via the databus 4, now becomes available to the digital signal processing which, if the determined line impedance lies within any of the regions of operation, results in tripping of the circuit-breaker(s) in question.

As mentioned previously, the measurement signal units 1, 2 and 3 of the zones are also tested. If a fault is detected in any of these units, the unit 5 triggers an alarm function via an output A and an OR-element 14.

As indicated earlier under "BACKGROUND ART", distance relays located at respective ends of the transmission line or the line section need to communicate with each other with respect to the measured line impedance and so on. Modern distance relays therefore include a so-called communication unit (shown as COMU as 15 in FIG. 1). The CCU unit 5 processes the information from the COMU unit 15 together with the information from the measurement signal units 1, 2, 3 so as to obtain correct tripping signals.

A device for carrying out the method of the invention can be formed in many similar ways within the scope of the following claims.

We claim:

1. A method of operating a digital distance relay for obtaining failsafe tripping signal outputs in the case of the detection of a fault from within anyone of a plurality of different measuring zones in a power supply network, comprising:
    measuring the voltage and current conditions in the plurality of different measuring zones by a like plurality of fault measuring signal units to generate fault signal output data and concurrent fixed start signals upon detection of a fault in any one of said plurality of different measuring zones;
    processing said fault signal output data in a central control unit to provide tripping signal outputs;
    substantially continuously testing the signal processing of the central control unit to ensure faultless operation thereof;
    switching said central control unit from a test function status to a distance relay function status to generate tripping function signals from said central control unit upon determination of a faulty processing by said central control unit; and
    generating backup tripping signals in response to said tripping function signals.

2. A method according to claim 1, further comprising monitoring said central control unit to obtain an alarm signal in response to the generation of said tripping function signals.

3. A method according to claim 1, wherein in the event of a fault condition in any one of the plurality of fault measuring signal units, the fault measurement of the affected zone is assumed by an another one of said plurality of fault measuring signal units measuring an adjacent measuring zone.

4. A method according to claim 1, further comprising blocking the generation of backup fault tripping signals by the central control unit upon detection of erroneous fault signal outputs from any of the plurality of fault measuring signal units.

5. A method according to claim 4, wherein said central control unit generates an alarm signal upon detection of erroneous fault signal outputs from any of the plurality of fault measuring signal units.

6. A method according to claim 1, wherein said backup tripping signals are enabled to be generated during the period when said tripping function signals are generated by said central control unit.

7. A distance relay device for obtaining failsafe tripping signal outputs in the case of detection of a fault from within different measuring zones in a power supply network, comprising:
    a plurality of measuring signal units for measuring the voltage and current conditions in a like plurality of different measuring zones to generate fault signal output data and concurrent fixed start signals upon detection of a fault in any of said plurality of different measuring zones;
    central control unit means for processing said fault signal output data to provide tripping signal outputs and being adapted to be substantially continuously tested to ensure faultless operation thereof;
    said central control unit means switching from a test function to a distance measurement function to generate tripping function signals upon determination of a faulty processing of said fault signal data; and
    tripping signal generation means responsive to said tripping function signals to generate backup tripping signals.

8. A device according to claim 7, further comprising monitoring means for generating an alarm signal in response to the generation of said tripping function signals.

9. A distance relay device according to claim 7, wherein upon the detection of erroneous fault signal data from any of said plurality of fault signal measuring units, said central control unit means processes signal data from a fault measurement signal unit measuring fault conditions in an adjacent measuring zone to that of the fault measuring signal unit generating said erroneous fault signal data.

10. A distance relay device according to claim 8, further comprising means for blocking the generation of said backup tripping signals in response to said central control unit determining erroneous fault signal data output from any of said plurality of fault signal measuring units.

11. A distance relay device according to claim 10, wherein said cenrtal control means generates an alarm control signal in response to the detection of erroneous fault signal output data and said monitoring means generates an alarm signal in response to said alarm control signal.

12. A distance relay device according to claim 7, wherein said means for generating backup tripping signals includes means for delaying the fault signal output data, logic means for gating the delayed fault signal output data and including a gating circuit responsive to said tripping function signals and a control gating signal, and means for amplifying the gated fault signal output data for generating said backup tripping signals.

13. A distance relay device according to claim 12, further comprising means for monitoring said central control means and generating a tripping control signal for actuating said gating circuit during the presence of said tripping function signals.

* * * * *